United States Patent
Wetterwald et al.

(10) Patent No.: US 9,866,431 B2
(45) Date of Patent: *Jan. 9, 2018

(54) DETERMINISTIC CONTROL LOOP SCHEDULING

(71) Applicant: Cisco Technology, Inc., San Jose, CA (US)

(72) Inventors: Patrick Wetterwald, Mouans Sartoux (FR); Pascal Thubert, La Colle sur Loup (FR); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,836

(22) Filed: Jun. 2, 2017

(65) Prior Publication Data
US 2017/0272315 A1    Sep. 21, 2017

Related U.S. Application Data

(63) Continuation of application No. 14/336,051, filed on Jul. 21, 2014, now Pat. No. 9,705,737.

(51) Int. Cl.
*H04J 1/16*    (2006.01)
*H04L 12/24*    (2006.01)

(52) U.S. Cl.
CPC .......... *H04L 41/0803* (2013.01); *H04L 41/04* (2013.01)

(58) Field of Classification Search
CPC ............................. H04L 41/0803; H04L 41/04

USPC .......................................................... 370/252
See application file for complete search history.

(56) References Cited

U.S. PATENT DOCUMENTS

| | | | |
|---|---|---|---|
| 5,706,278 A * | 1/1998 | Robillard .......... | H04L 12/40156 370/222 |
| 7,356,372 B1 * | 4/2008 | Duncan .............. | G07C 9/00103 340/506 |
| 7,996,113 B2 | 8/2011 | Yuan et al. | |
| 8,041,834 B2 | 10/2011 | Ferri et al. | |
| 8,379,521 B2 * | 2/2013 | Talanis .................. | H04L 49/351 370/230 |
| 2006/0245454 A1 | 11/2006 | Balasubramanian et al. | |
| 2008/0165699 A1 * | 7/2008 | Wei ....................... | H04W 40/22 370/252 |
| 2010/0061264 A1 * | 3/2010 | Campbell ........... | H04L 43/0852 370/253 |
| 2011/0255418 A1 * | 10/2011 | van Greunen ...... | H04L 41/0659 370/242 |
| 2014/0047137 A1 * | 2/2014 | Mathason .......... | G05B 19/0423 710/33 |

* cited by examiner

*Primary Examiner* — Peter Cheng
(74) *Attorney, Agent, or Firm* — Parker Ibrahim & Berg LLC; James M. Behmke; Stephen D. LeBarron

(57) ABSTRACT

In one embodiment, a scheduling device in a network receives routing metrics regarding a network path between a device controller and a networked device. The scheduling device also receives controller metrics for the device controller. The scheduling device determines time costs associated with the network path and one or more control operations performed by the device controller, based on the routing and controller metrics. The scheduling device generates a communication schedule based on the time costs and instructs the device controller and the networked device to use the communication schedule.

18 Claims, 15 Drawing Sheets

DETERMINISTIC CONTROL LOOP SCHEDULING

RELATED APPLICATION

The present application is a Continuation application of U.S. patent application Ser. No. 14/336,051, filed Jul. 21, 2014, entitled DETERMINISTIC CONTROL LOOP SCHEDULING, by Patrick Wetterwald et al., the contents of which is hereby incorporated by reference.

TECHNICAL FIELD

The present disclosure relates generally to computer networks, and, more particularly, to deterministic control loop scheduling in a network.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
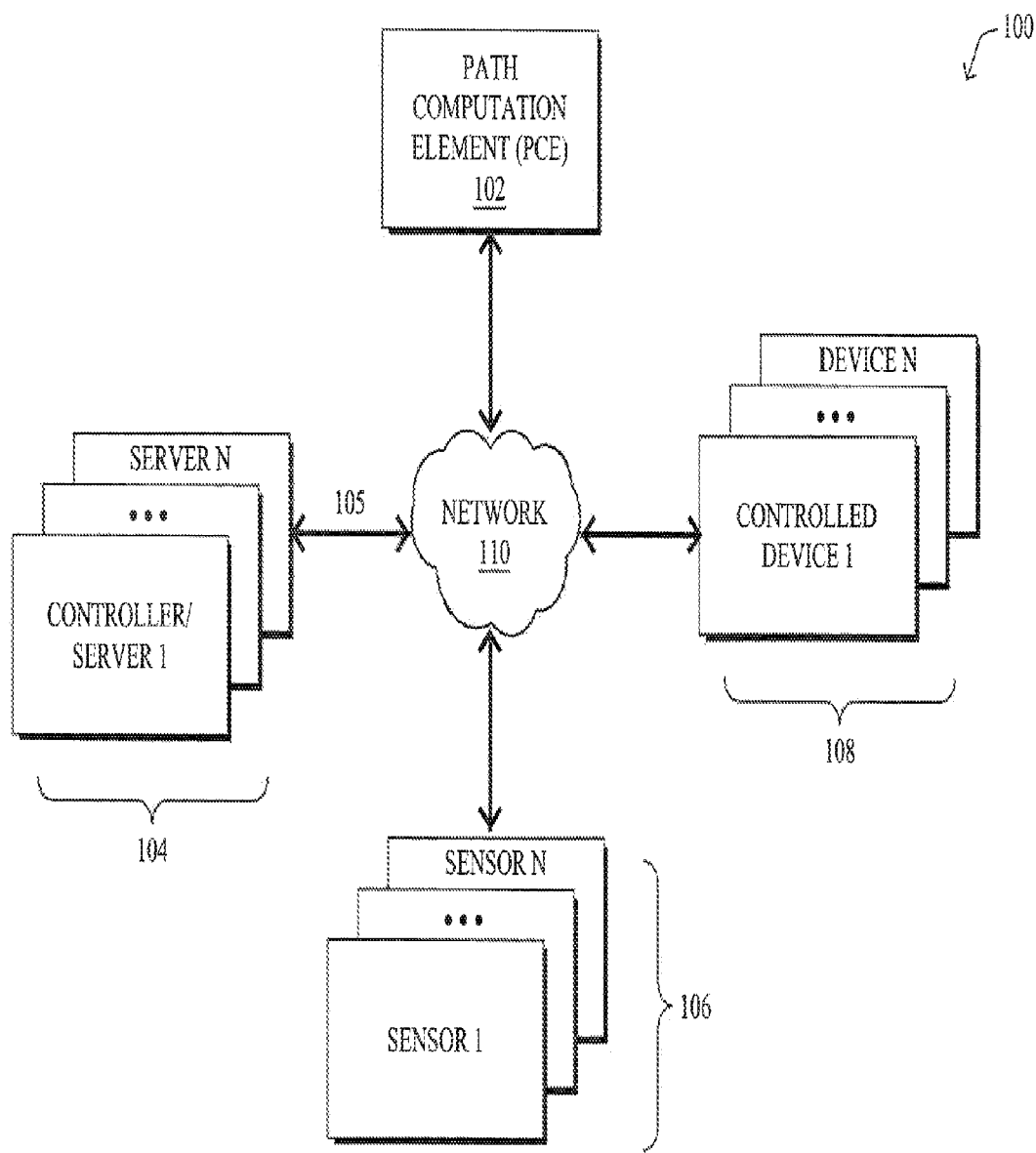
FIG. 1 illustrates an example communication network.

According to one or more embodiments of the disclosure, a scheduling device in a network receives routing metrics regarding a network path between a device controller and a networked device. The scheduling device also receives controller metrics for the device controller. The scheduling device determines time costs associated with the network path and one or more control operations performed by the device controller, based on the routing and controller metrics. The scheduling device generates a communication schedule based on the time costs and instructs the device controller and the networked device to use the communication schedule.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer system 100 illustratively comprising nodes/devices 200 (e.g., labeled as shown, "controller(s)/server(s) 104," "path computation element (PCE) 102," "sensor(s) 106," and "controlled device(s) 108" and described below) interconnected by various methods of communication. For instance, the links 105 may be wired links or shared media (e.g., wireless links, PLC links, etc.) where certain nodes 200 may be in communication with other nodes 200, e.g., based on distance, signal strength, current operational status, location, etc., via a network 110. Those skilled in the art will understand that any number of nodes, devices, links, etc. may be used in the computer network, and that the view shown herein is for simplicity. Also, those skilled in the art will further understand that while the network is shown in a certain orientation, system 100 is merely an example illustration that is not meant to limit the disclosure.

Data packets (e.g., traffic and/or messages sent between the devices/nodes) may be exchanged among the nodes/devices of the computer system 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

According to various embodiments, network 110 may be, or may include, a Low Power and Lossy Network (LLN). LLNs (e.g., certain sensor networks), may be used in a myriad of applications, such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 2:
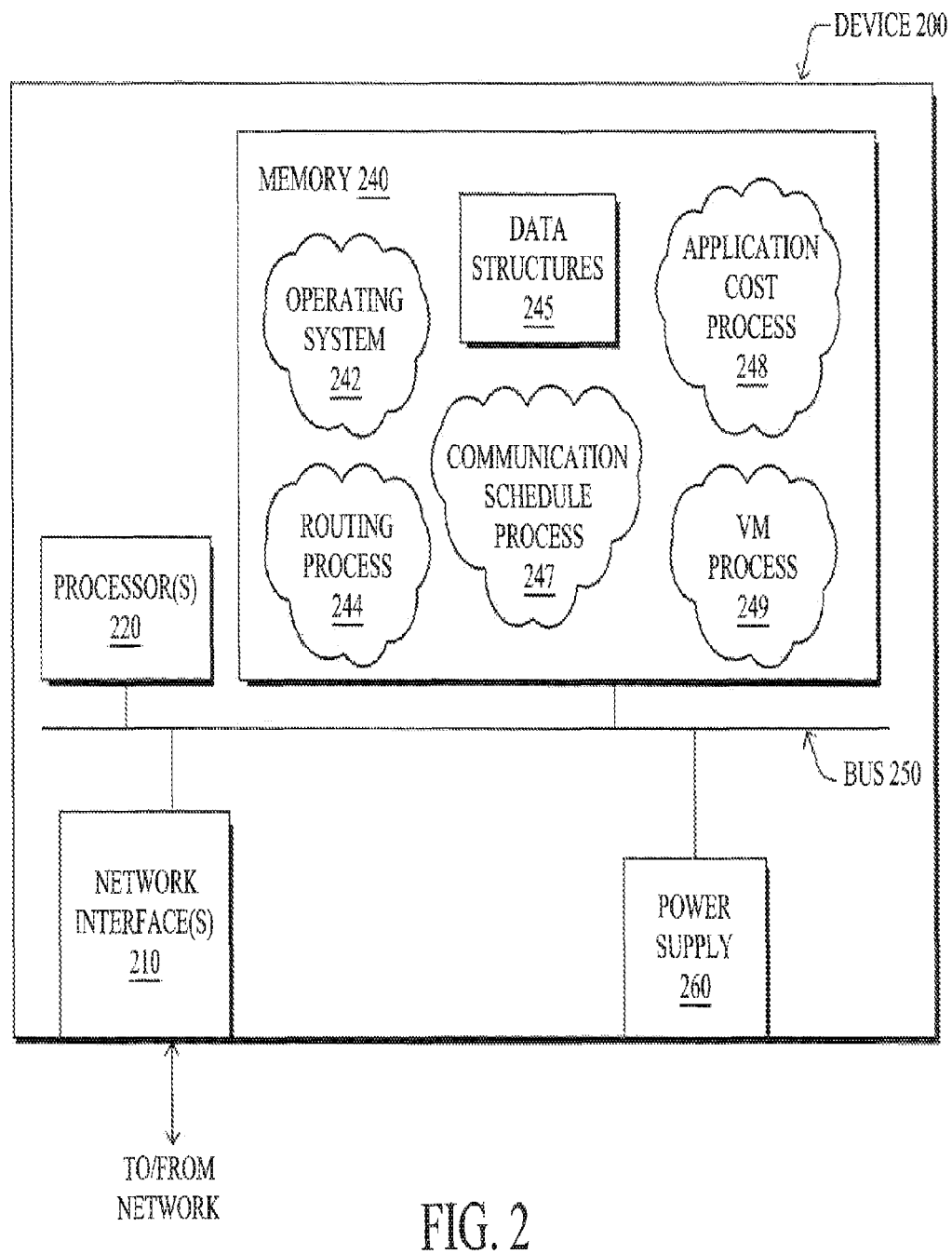
FIG. 2 illustrates an example network device/node.

FIG. 2 is a schematic block diagram of an example node/device 200 that may be used with one or more embodiments described herein, e.g., as any of the nodes/devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 110. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes/services may comprise routing process 244, a communication schedule process 247, an application cost process 248, and/or an illustrative virtual machine (VM) process 249, as described herein. Note that while routing process 244 is shown in centralized memory 240, alternative embodiments provide for the process to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 include computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

An example routing protocol that is particularly suited for LLN applications and may be supported by routing process 244 is specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012). RFC 6550 provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing packets, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

VM process 249 includes the computer executable instructions executed by the processor(s) 220 to allocate, de-allocate, and/or execute one or more virtual machines. In general, a virtual machine is a software process that emulates the functioning of an actual device (e.g., by virtualizing hardware, etc.). Notably, multiple virtual machines may be allocated on the same hardware device, thereby allowing a single device or server to emulate the functioning of multiple devices. For example, a device controller, such as a programmable logic controller, may be virtualized within a dedicated CPU (e.g., one or more of processors 220) as part of a controller/server 104 shown in FIG. 1. For example, control applications may be executed within a data center or in a fog (e.g., mostly distributed) computing environment.

Application cost process 248 includes the computer executable instructions executed by the processor(s) to report and/or analyze the costs associated with a particular control application. For example, allocation of a new control application as a virtual machine by VM process 249 may consume an amount of resources (e.g., processing power, memory, etc.) and have associated time costs to transfer, load, execute, etc., the control application. In general, and as described in greater detail below, application cost process 248 may report the data indicative of the application time costs and/or analyze such data, to determine an overall time cost associated with the control application.

Communication schedule process 247 includes the computer executable instructions executed by the processor(s) 220 to generate and/or utilize a communication schedule. In general, communication schedule process 247 may be configured to generate a communication schedule for one or more devices (e.g., as a supervisory process) and/or to utilize a generated communication schedule to communicate with another networked device via network interface(s) 210.

According to various embodiments, network communications facilitated by process 247 within network 110 may be deterministic. Notably, low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion (e.g., by routing processes 244), but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), which is hereby incorporated by reference and referred to herein as "6TiSCH". The centralized computation is typically done by a PCE (e.g., PCE 102) with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol. The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on time slotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The time slotted aspect of the TSCH technology is a time division multiplexing (TDM) technique, which requires all nodes in the network to be time synchronized. In other words, time is sliced up into time slots with a given time slot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and time slots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 3A:
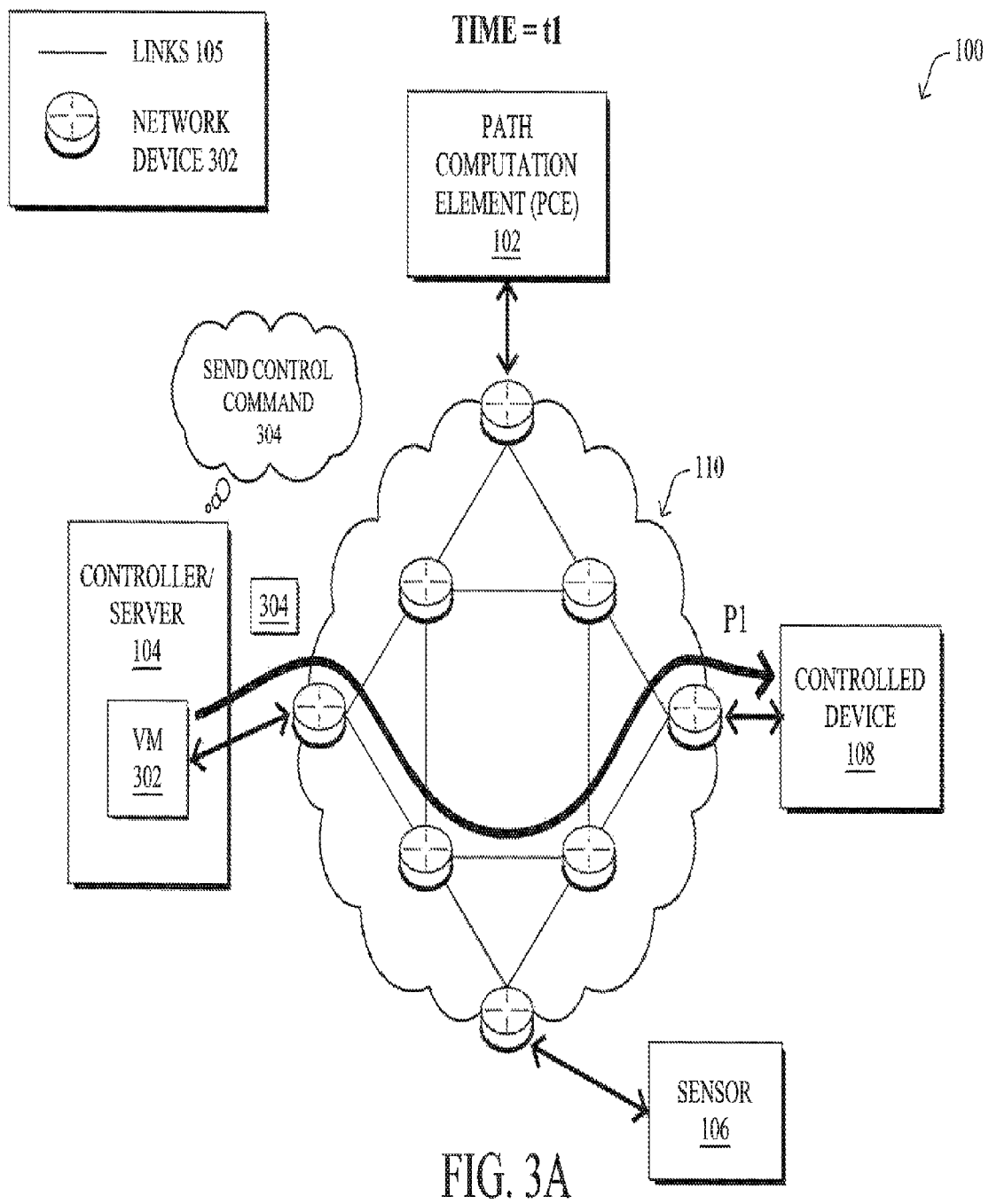
FIGS. 3A-3D illustrate an example control loop in the communication network of FIG. 1.

Referring now to FIGS. 3A-3D, an example control loop in the communication network of FIG. 1 is shown, according to various embodiments. In FIG. 3A, a controller/server 104 may send a control command 304 to a controlled device 108 at a time T=t1 along a network path P1 via any number of intermediary network devices 302 (e.g., other controlled devices, routers, switches, sensors, etc.). In various embodiments, control command 304 may be sent in accordance with a communication schedule and/or routing path, as determined by PCE 102. For example, assume that controlled device 108 is an actuator, or includes an actuator, that opens or closes a damper. In such a case, control command 304 may instruct controlled device 108 to open or close the damper by a specified amount. In some embodiments, as shown, control command 304 may be generated by a virtual machine (VM) 302 that executes a control application for controlled device 108. In other embodiments, control command 304 may be generated by a non-virtualized controller (e.g., a programmable logic controller, etc.).

Figure 3B:
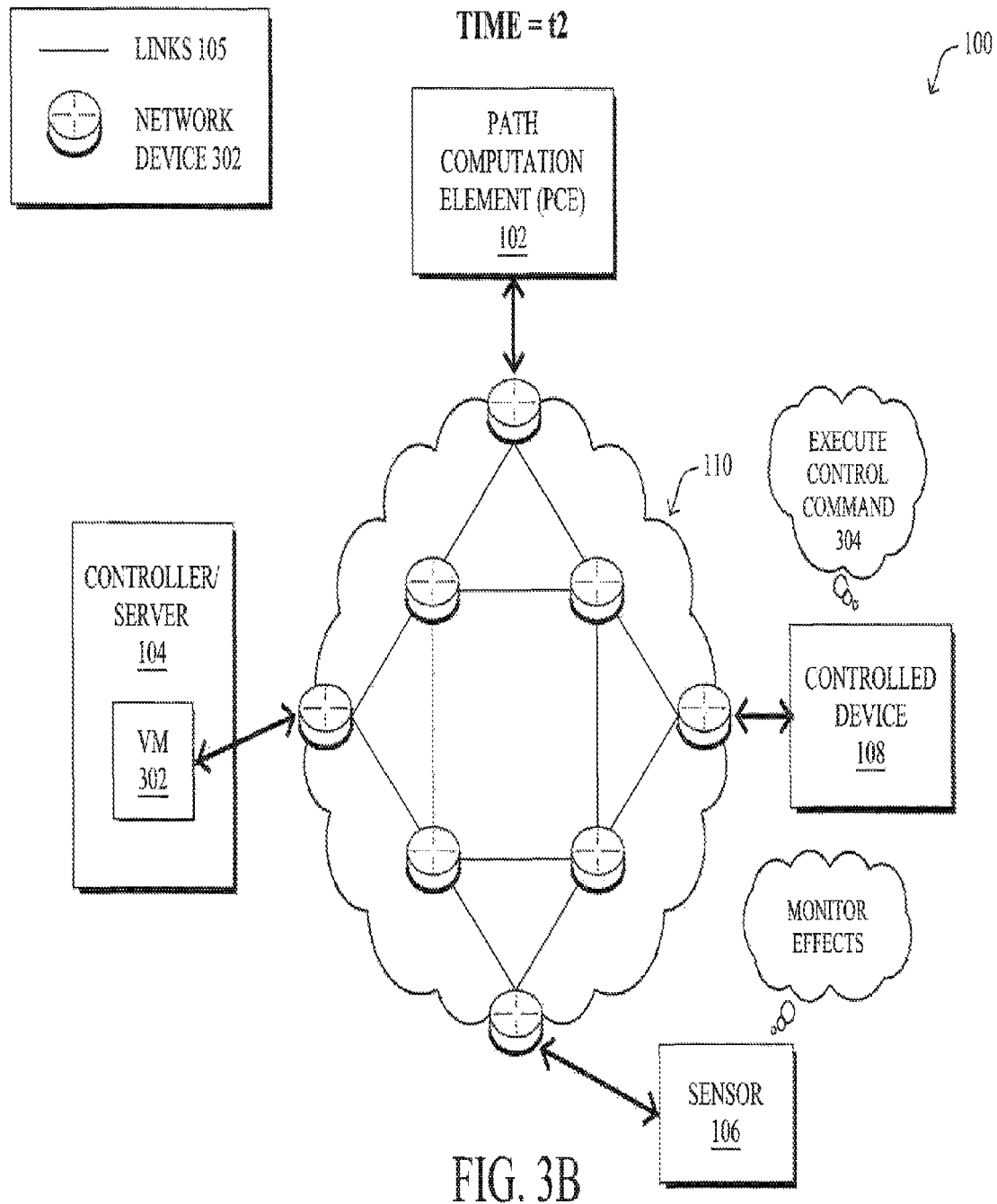

In FIG. 3B, the controlled device 108 executes control command 304 at a time T=t2. Continuing the above example, this may correspond to controlled device 108 opening a damper or performing any other controlled operation. Notably, the time difference between t1 and t2 may be a function of the transmission time along path P1 for control command 304 to reach controlled device 108. In some cases, one or more sensors 106 may also monitor the effects of the executed control command 304. For example, opening a damper may change an air temperature that is monitored by sensors 106. In various embodiments, sensor(s) 106 may be separate devices from that of controlled device 108 or integrated therein.

Figure 3C:
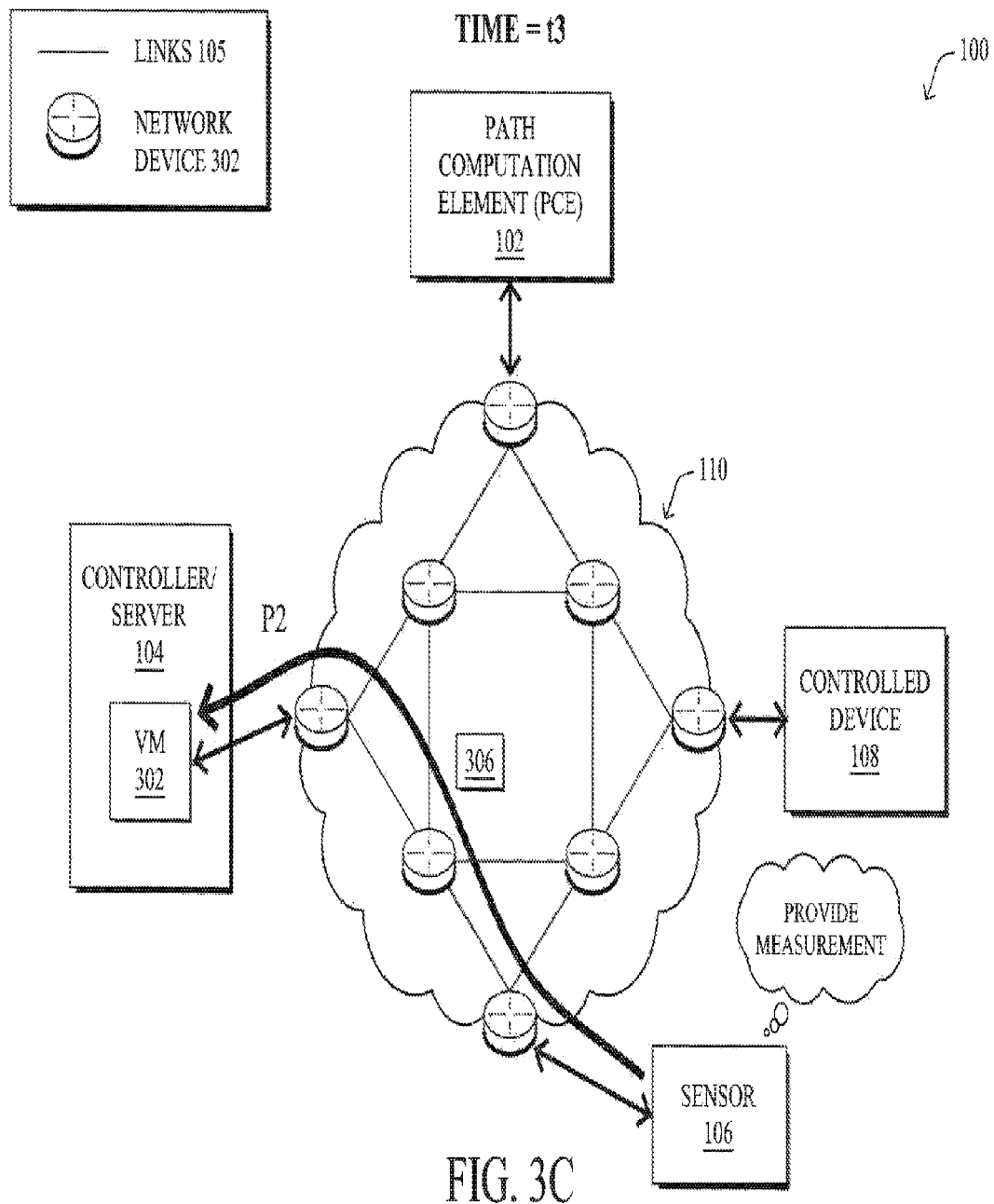

In FIG. 3C, sensor(s) 106 may provide measurement data 306 to controller/server 104 at a time T=t3. Measurement data 306 may include any raw measurements regarding the effects of controlled device 108 executing control command 304 and/or any calculated values derived therefrom (e.g., statistics, computations, etc.). In various embodiments, measurement data 306 may be communicated at a specific time, in accordance with a communication schedule assigned to sensor 106 (e.g., by PCE 102). In some cases, measurement data 306 may be communicated to controller/server 104 along the same path as control command 304, such as when sensor(s) 106 are integrated into controlled device 108. In other embodiments, measurement data 306 may be provided to controller/server 104 along a separate path P2 that traverses different intermediary devices within network 110.

Figure 3D:
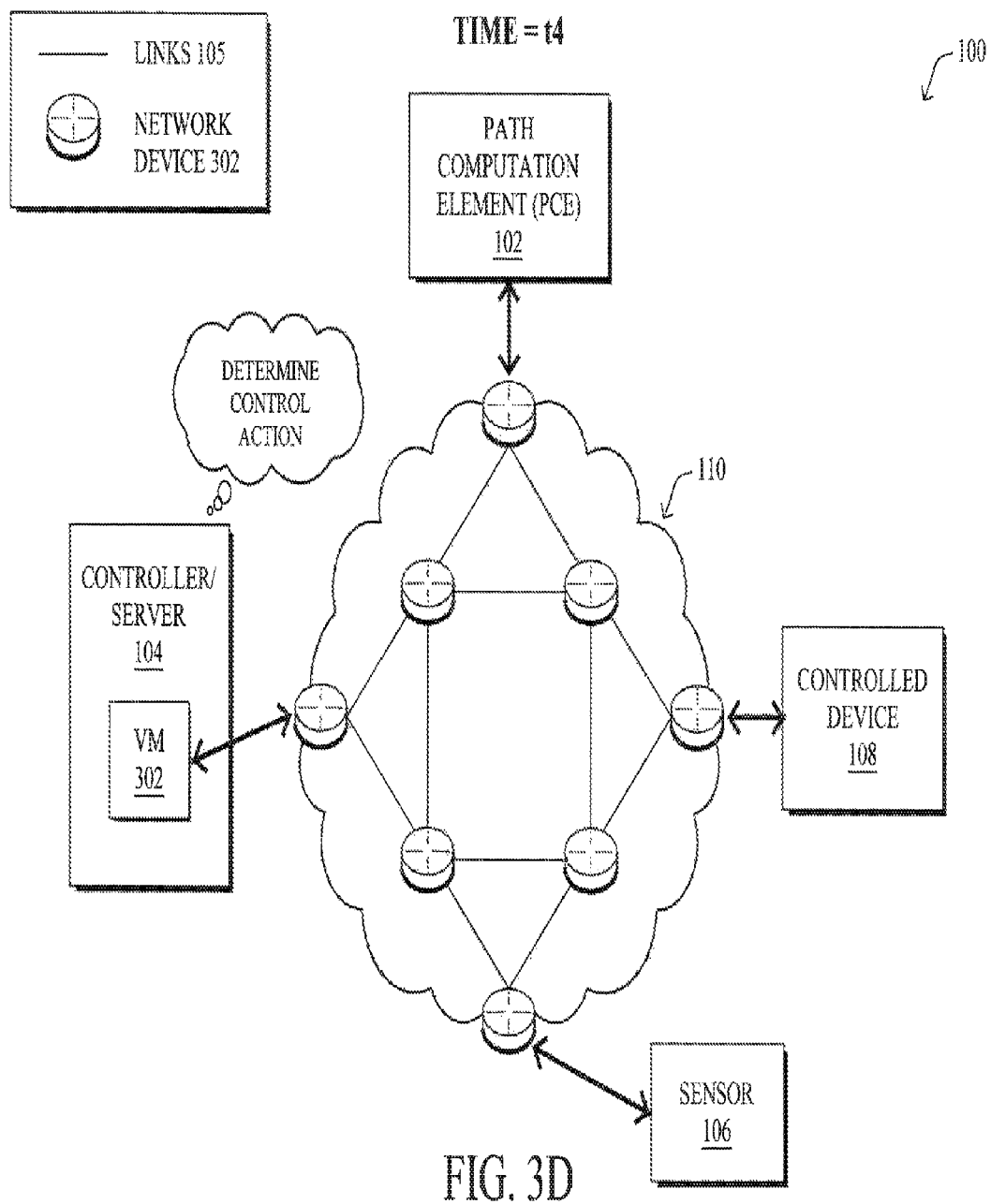

In FIG. 3D, controller/server 104 may determine a control action at a time T=t4 based on the received measurement data 306. For example, if the air temperature measured by sensor 106 is a function of a damper that is actuated by controlled device 108, controller may use the measured temperature to determine whether further adjustments to the damper are needed. Said differently, controller/server 104, controlled device 108, and sensor(s) 106 may operate as part of a control loop that functions to regulate the air temperature via control of a damper.

As described above, implementing determinism in a networked control loop requires a relatively precise timing mechanism whereby the various operations in the control loop are performed at specific times. For example, excessive path delays along path P1 shown in FIG. 3A may cause control command 304 to reach controlled device 108 after the controlled conditions have already changed and before measurement data 306 regarding the changed conditions is reported back to controller/server 104. In addition the control application itself may exhibit a certain amount of delay. For example, certain time costs may be associated with the transferring, allocating, execution, etc. of the control application within VM 302.

Deterministic Control Loop Scheduling

The techniques herein introduce a mechanism whereby routing and/or scheduling decisions along an end-to-end network path take into account both the communication time costs and the application execution time costs. In some aspects, the scheduling computations by a PCE or other network device of an overall communication schedule for a device may also include the scheduling of the control application. Such a communication schedule may be distributed throughout the network to the corresponding devices within a control loop (e.g., an application server executing a control application within a VM or fog environment, a controlled device, etc.). Notably, end-to-end delays along a path may be guaranteed using the approaches herein, such that potential execution delays are also considered.

Specifically, according to one or more embodiments of the disclosure as described in detail below, a scheduling device in a network receives routing metrics regarding a network path between a device controller and a networked device. The scheduling device also receives controller metrics for the device controller. The scheduling device determines time costs associated with the network path and one or more control operations performed by the device controller, based on the routing and controller metrics. The scheduling device generates a communication schedule based on the time costs and instructs the device controller and the networked device to use the communication schedule.

Illustratively, the techniques described herein may be performed by hardware, software, and/or firmware, such as in accordance with the processes 244 and 247-249 shown in FIG. 2, which may include computer executable instructions executed by the processor 220 (or independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Operationally, a controller (e.g., a logic controller, etc.) within a networked control loop may be virtualized as an application running in the cloud or in a data center environment. Such an environment may handle the execution of any number of virtualized controllers in parallel (e.g., tens, hundreds, thousands, etc.). In some embodiments, the virtual controllers may be interconnected via a fully scheduled network (e.g., an IP network) with the controlled devices, sensors, or other components of the corresponding control loops. Notably, the controlled devices, sensors, etc., may be physical devices or virtualized, in various embodiments.

Virtualized controllers provide a sharp contrast with implementations that use a physical programmable logic controller within a control loop. For example, the corresponding sensors, controlled devices, etc. within the control loop may be directly connected to a dedicated programmable logic controller over a serial link. Such an implementation introduces almost no delays into the control process, allowing for determinism to be implemented easily within the control loop. When virtualized controllers are used, however, as noted above, control devices are no longer dedicated to specific devices in the control loop, leading to network and execution delays.

In some embodiments, the networked devices that are part of a control loop with a virtualized controller may use a timing protocol, to ensure a common time reference across the devices. Such a protocol may operate to synchronize the clocks of the control application server(s) that execute the virtualized controller, the networking devices along a communication path used in the control loop, and any sensors or controlled devices that belong to the control loop. For example, the various devices may use the Precision Time Protocol (PTP), to synchronize the clocks of the various devices involved in the control loop. Any communication schedule distributed to the devices may be based on the common time reference. In some cases, the control loop itself may be represented as a Program/Project Evaluation and Review Technique (PERT) diagram that denotes the devices and timing aspects of the control loop's operation.

Figure 4A:
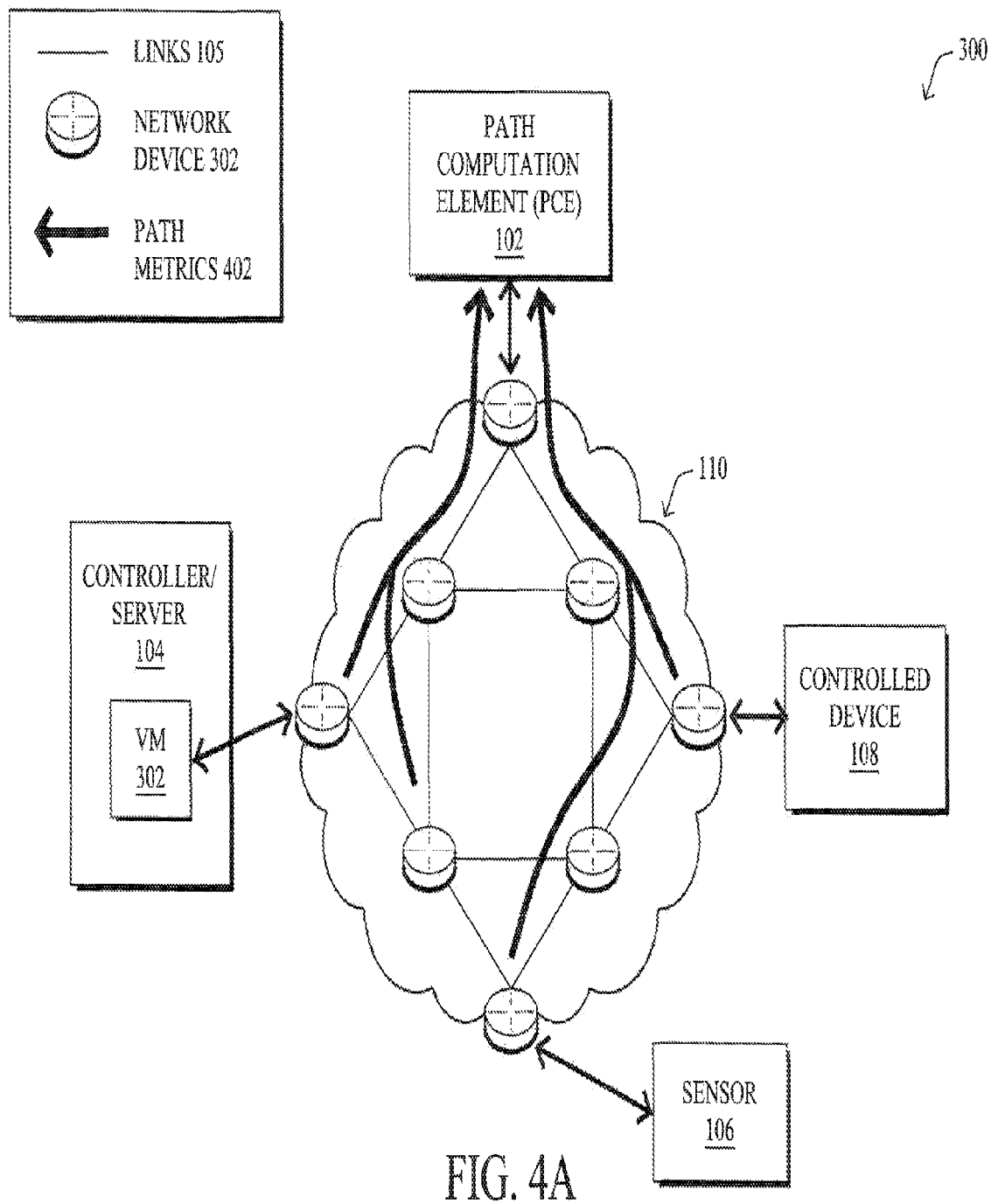
FIGS. 4A-4D illustrate an example of a communication schedule being generated.

FIGS. 4A-4D illustrate an example of a communication schedule being generated for a control loop, according to various embodiments. In some aspects, a PCE or other network device may be leveraged to compute the path(s) between devices of the control loop and/or the communication schedules to be used by the devices (e.g., the times at which a packet is to be received or sent). Routing decisions made by the PCE may be based on path metrics and other topology information received by the PCE from the various devices participating in the control process. For example, as shown in FIG. 4A, PCE 102 may receive path metrics 402 via the routing protocol used within network 110 (e.g., IS-IS, OSPF, etc.). In response, PCE 102 may compute a path between devices of the control loop based on path metrics 402 and any path requirements in terms of path delays or jitter.

Figure 4B:
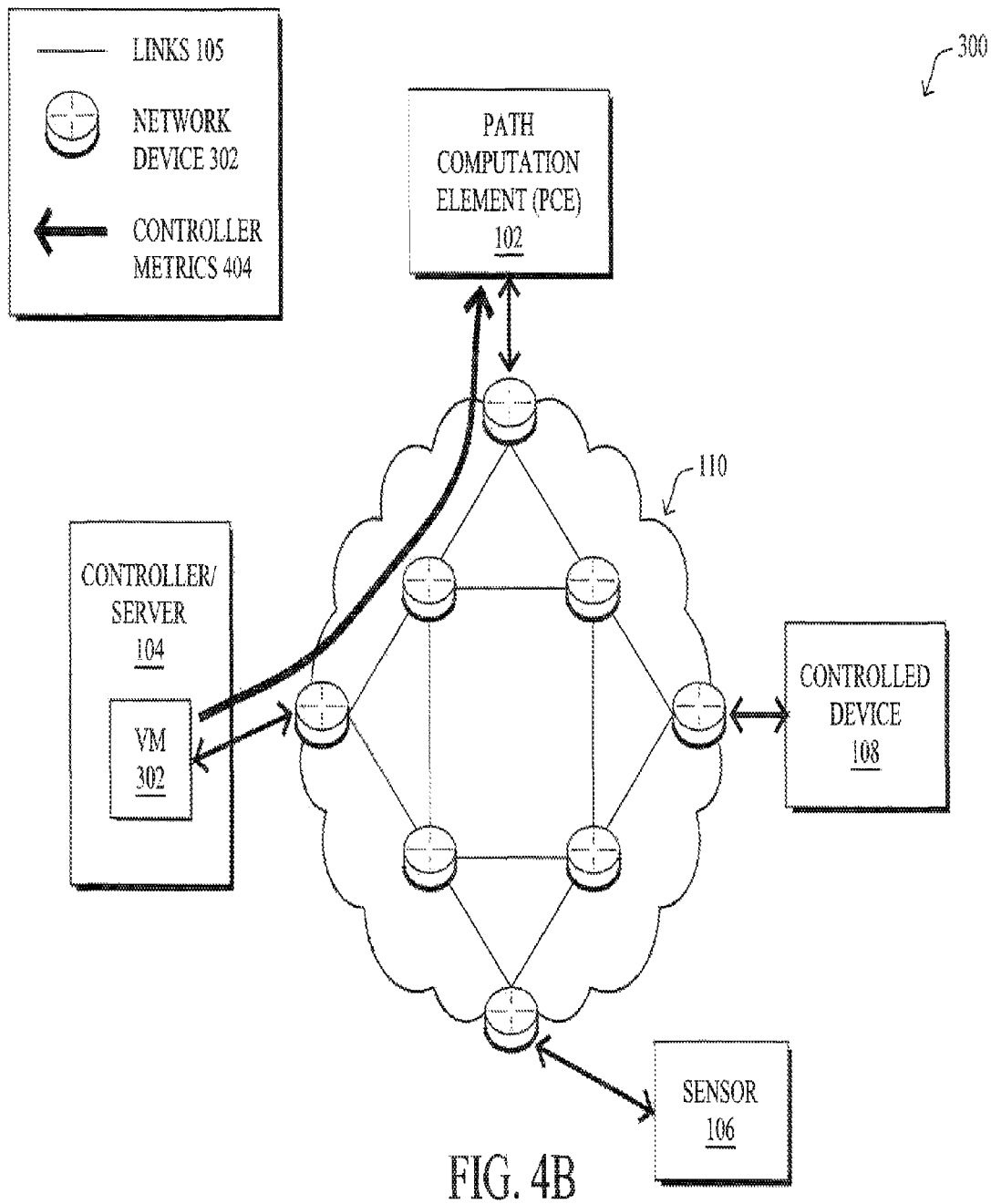

In various embodiments, as shown in FIG. 4B, a PCE or other scheduling device may receive data relating to the execution of the control application used within the control loop. For example, PCE 102 may receive controller metrics 404 from controller/server 104. In some cases, a path computation element communication protocol (PCEP) may be extended with new type-length-values (TLVs) to convey controller metrics 404 to PCE 102. In general, controller metrics 404 include information regarding the execution of a control application or task within a dedicated CPU (e.g., as executed within virtual machine 302). For example, controller metrics 404 may indicate the amount of delay between the triggering of a control application and when the application actually starts, the delay until an already loaded application can be scheduled, a delay to transfer a control application to or from that CPU (e.g., to transfer the control application to another virtual machine), CPU execution time (if not interrupted), a time when a packet from a control application could be sent, combinations thereof, or any other information related to the execution time of the control application. In some cases, controller metrics 404 may be retrieved from one or more of servers 104 or data centers through customized TLV extensions to the routing protocol (e.g., IS-IS, etc.), to take into account the new resource that is a schedulable application. Using controller metrics 404, PCE 102 may actively maintain information regarding the control applications and their corresponding running times, as well as the locations (e.g., servers) at which the applications are executed.

Figure 4C:
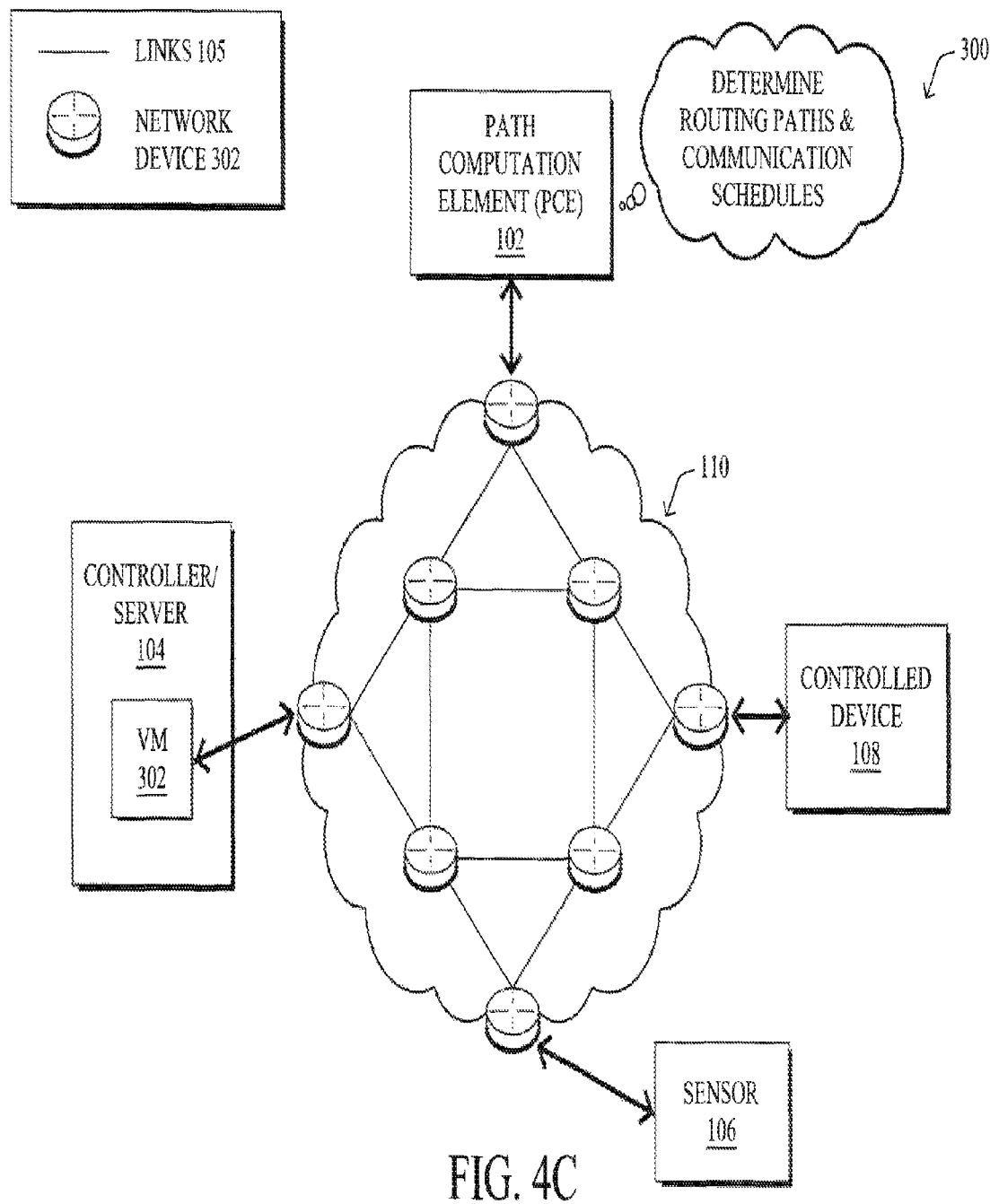

Based on the received routing metrics and controller metrics, a PCE or other scheduling device may compute a complete path and communication schedule for devices in the control loop. For example, as shown in FIG. 4C, PCE 102 may use path metrics 402 and controller metrics 404 to compute a complete path and schedule that takes into account both network transmission delays, as well as application execution delays for the control application. In implementations in which controllers are virtualized, PCE 102 may further use the received path metrics 402 and controller metrics 404, to select how the control application is to be executed (e.g., by selecting which of servers 104 is to execute the virtual machine) and to take into account any delays associated with virtual machine transfers, loading, waking, etc. In other words, PCE 102 may provide information related to the time-based data transport and applications scheduling, in order to guarantee an overall application response time.

Figure 4D:
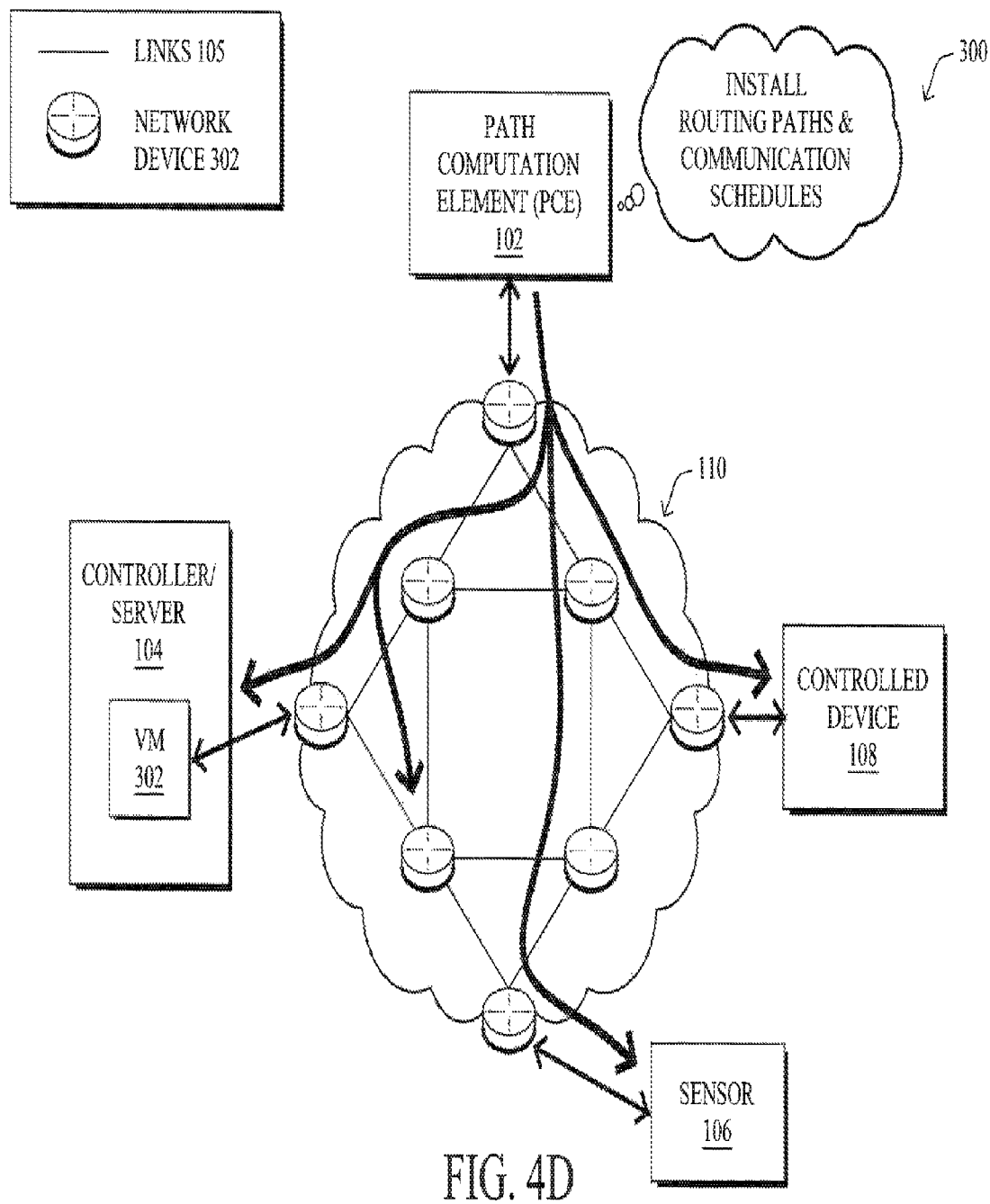

Once the paths and communication schedules for the control loop are determined by the PCE or other scheduling device, the routing paths and communication schedules may be installed onto the various devices involved in the control loop. For example, as shown in FIG. 4D, PCE 102 may install the routing paths and communication schedules to the various network devices 302 (e.g., routers, switches, etc.), controller(s)/server(s) 104, sensor(s) 106, or controlled device(s) 108 via PCEP messages. In some embodiments, installation of a path by PCE 102 may also involve instructing a particular server 104 to execute the control application within a virtual machine.

The communication schedules generated by a PCE or other scheduling device may facilitate the various control operations of the control loop during runtime. Such operations may include, but are not limited to, the emission of a packet by a sensor (e.g., sensor 106) at an exact time, the transmission of the packet from the sensor to the controller/server (e.g., controller/server 104) via the network, reception of the packet by the controller/server, triggering and dispatch of the control application by the controller/server, emission of the resulting control command from the controller/server to the controlled device (e.g., controlled device 108) at a scheduled time, transmission of the control command via the network, and reception of the control command by the controlled devices at a precise time.

Figure 5A:
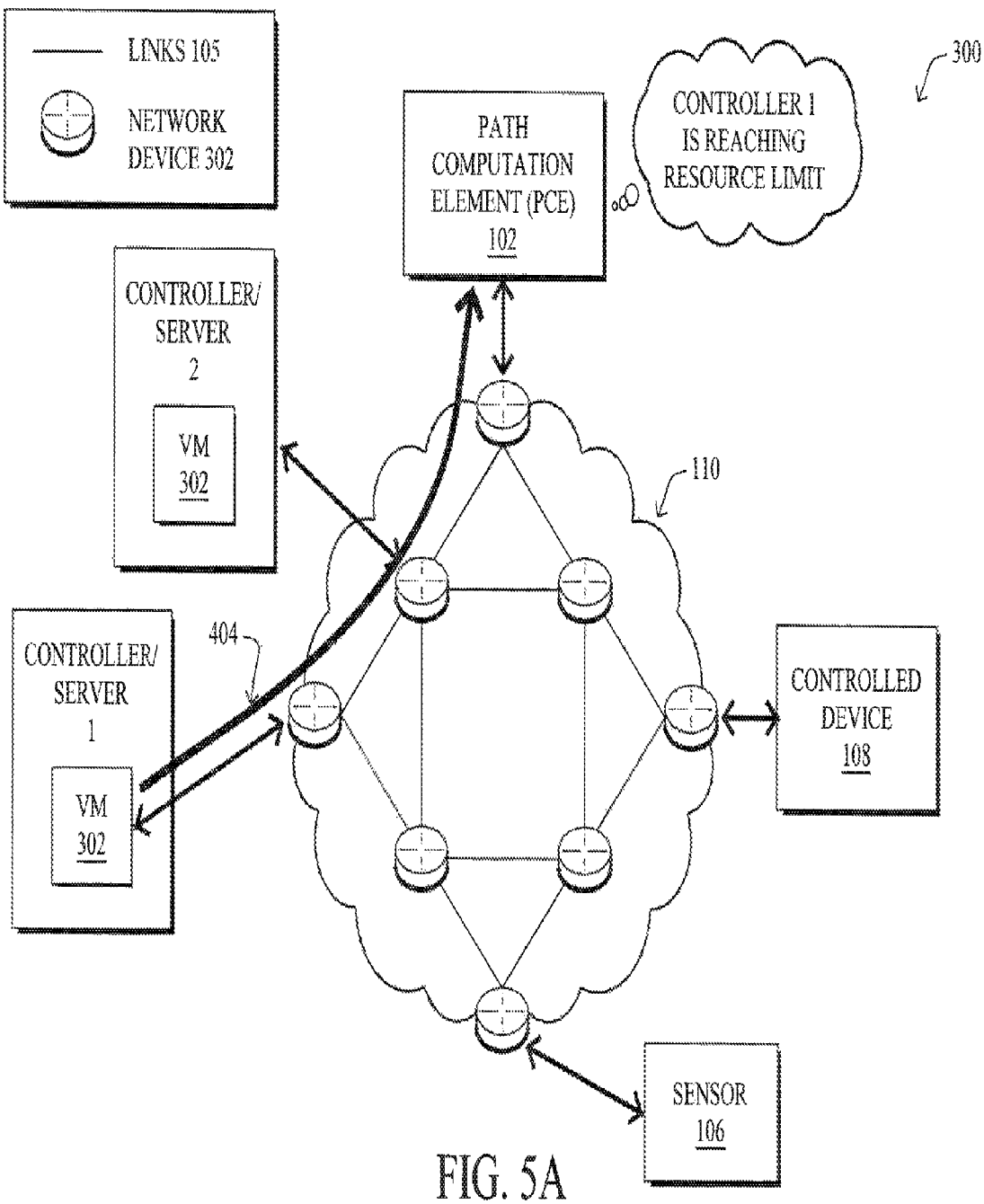
FIGS. 5A-5C illustrate an example of control being passed between controllers.
Figure 5B:
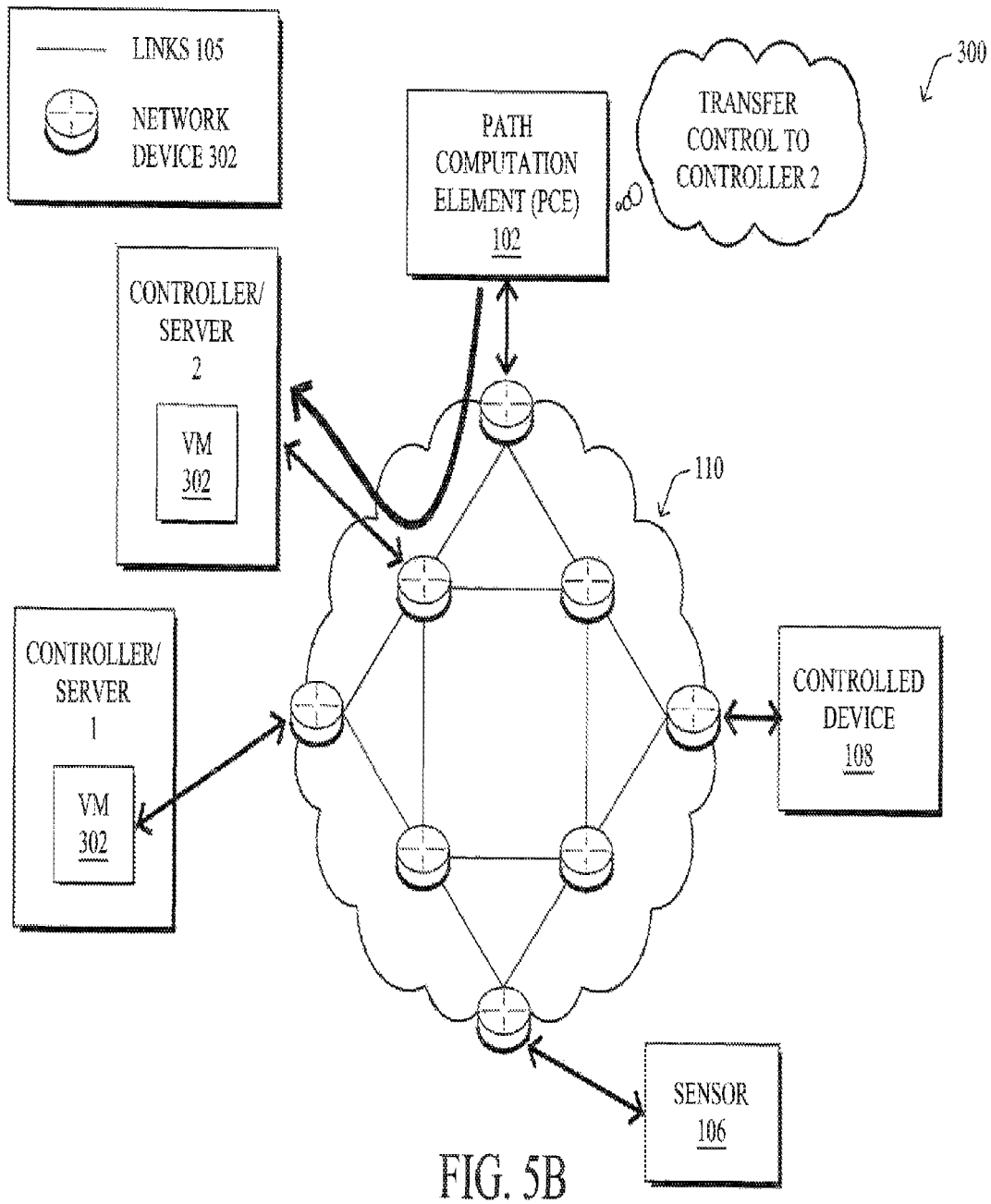
Figure 5C:
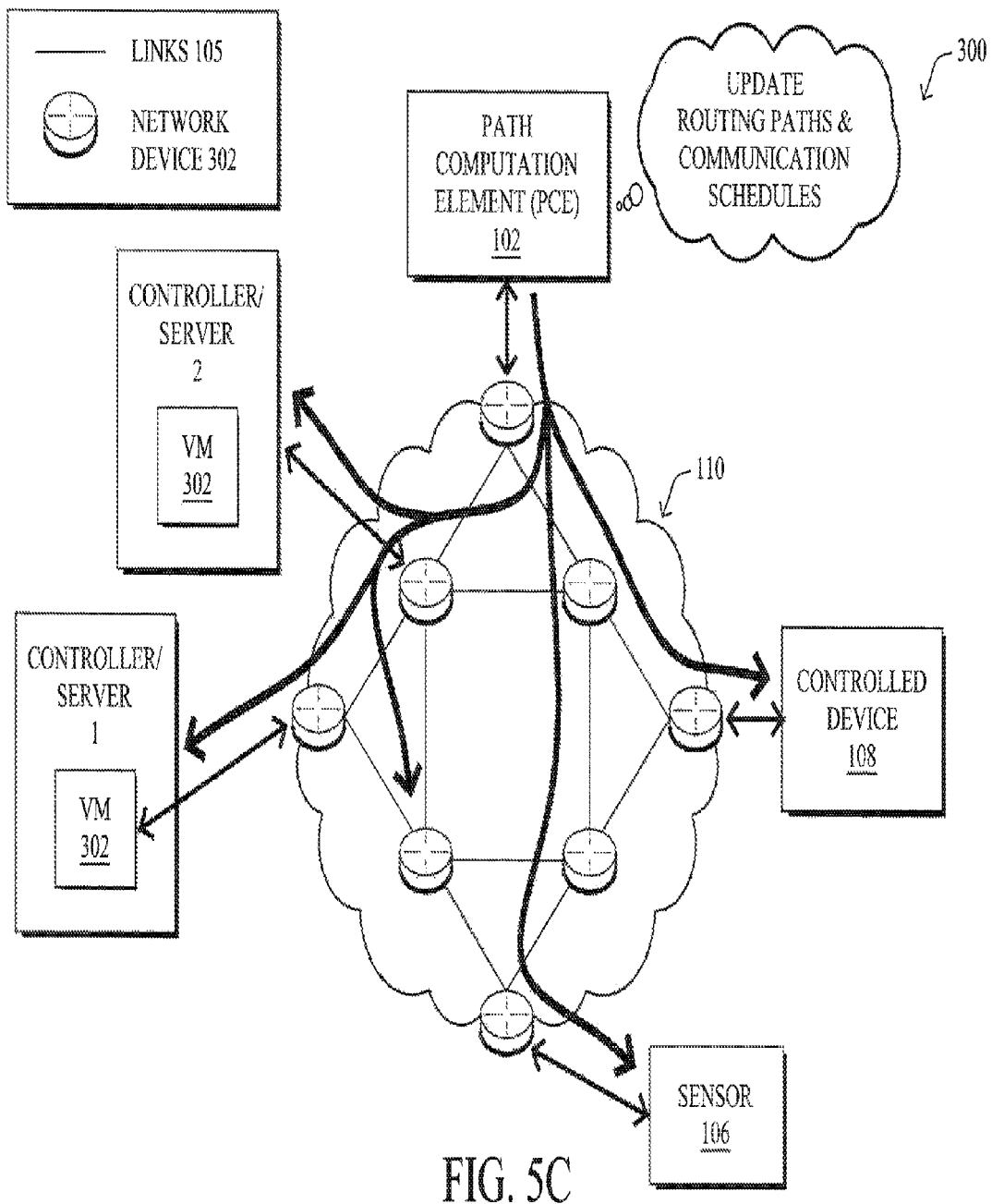

FIGS. 5A-5C illustrate an example of control being passed between virtualized controllers, according to various embodiments. In some cases, the resources consumed by an application server hosting a virtualized controller may approach a threshold amount (e.g., a CPU limit, a memory limit, etc.). In these and other cases, an update may be sent to the PCE or other scheduling device, to offload the virtualized controller to another server in time before the next scheduled operation of the controller is to occur (e.g., before the controller is to receive a sensor measurement, etc.). For example, as shown in FIG. 5A, assume that a control application is executed within virtual machine 302 on controller/server 1 and that server 1 is running out of memory. In such a case, server 1 may notify PCE 102 of its limited resources (e.g., via controller metrics 404 included in a PCEP message).

In response to determining that a server is running out of resources, the PCE may identify another server with more resources available (e.g., CPU, memory, etc.), transfer the virtual machine to the new server, and cause the virtual machine to be loaded in the new server in time for the next scheduled operation of the control application. For example, as shown in FIG. 5B, PCE 102 may identify controller/server 2 as a suitable host for virtual machine 302 based on the controller metrics received from server 2 and/or any path changes that would result from the transfer (e.g., changes in delays between the servers). In one embodiment, PCE 102 may transfer virtual machine 302 between servers 1 and 2, to balance the resource loads experienced by the two servers (e.g., as part of a load balancing mechanism).

Once the PCE has identified a new application server and computed the corresponding paths between the new server and the devices in the control loop, the PCE may then trigger a path and server change. For example, as shown in FIG. 5C, PCE 102 may update the routing paths and/or communication schedules used by the various devices involved in the control loop, to pass control of the loop to server 2. In some cases, the path and server change(s) may be triggered via the virtual machine migration itself within a data center environment. In another embodiment, the new application server may be located in the fog and be seen as distributed CPU resources. In yet another embodiment, should the over response time be close to the maximum delay, the PCE may provide a set of diverse end-to-end paths, where the notion of path is now extended to the inclusion of different computing devices.

Figure 6:
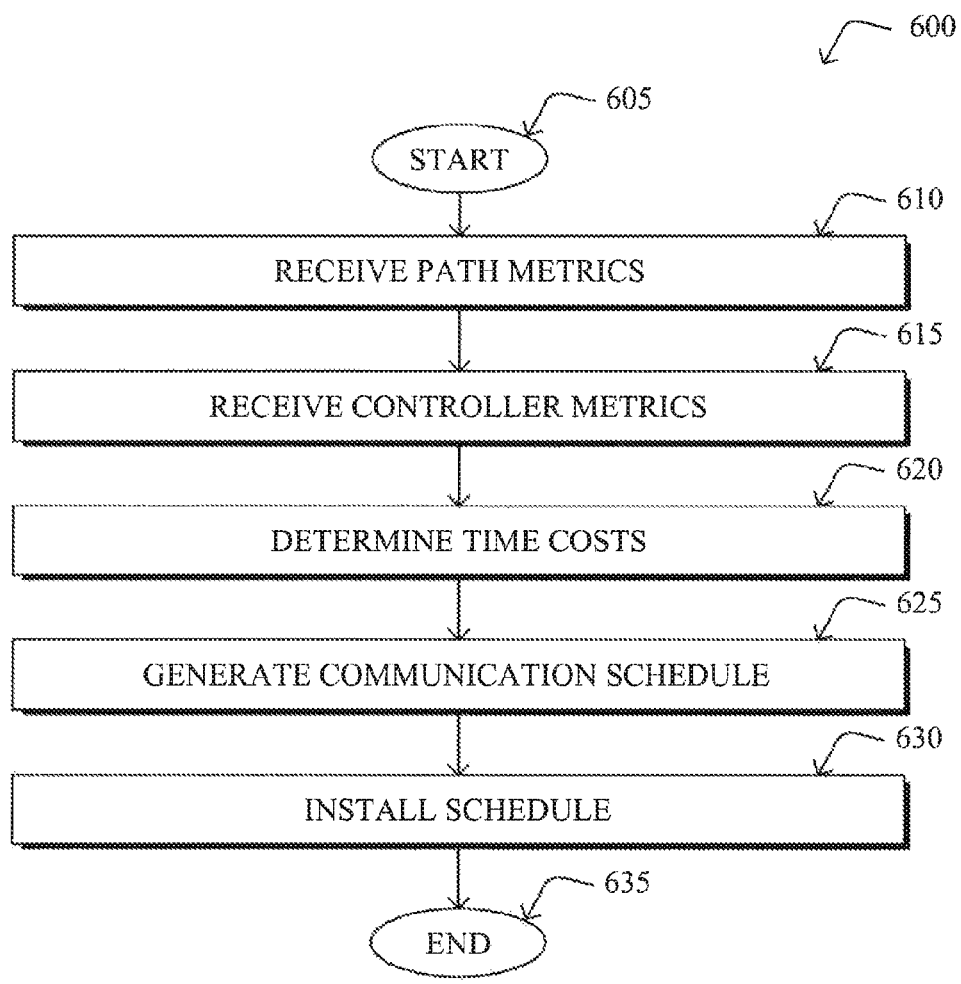
FIG. 6 illustrates an example simplified procedure for generating a communication schedule for a deterministic control loop.

FIG. 6 illustrates an example simplified procedure for generating a communication schedule for a deterministic control loop in accordance with one or more embodiments described herein. The procedure 600 may start at step 605, and continues to step 610, where, as described in greater detail above, routing path metrics are received at a scheduling device, such as a PCE. In general, the path metrics include data indicative of the time costs associated with transferring data along the various links of one or more routing paths. For example, the path metrics may include delay or latency information, jitter information, queuing information, and the like, for the path(s). In some embodiments, the metrics may be received via a routing protocol (e.g., IS-IS, etc.).

At step 615, the scheduling device receives controller metrics, as described in greater detail above. In general, the controller metrics are indicative of the time costs associated with a particular controller/server executing a control application. For example, the controller metrics may include data regarding a delay associated with loading a control application or virtual machine, a delay associated with scheduling the control application to execute, an execution time associated with the control application performing a particular operation (e.g., performing a particular computation, generating a control command, etc.), or any other information regarding the execution of a control application. In some embodiments, the controller metrics may be provided within a PCEP message that has been extended with additional TLVs to accommodate the controller metrics.

At step 620, the scheduling device determines time costs associated with the network path and one or more control operations performed by the controller, as described in greater detail above. In other words, an end-to-end path time cost may be determined that takes into account both the communication delays along a network path, as well as any application delays associated with executing the control application.

At step 625, the scheduling device generates a communication schedule for the control loop, as detailed above. In general, the communication schedule denotes the times at which a given device participating in the control loop (e.g., a sensor, controlled device, virtualized controller, etc.) receives or transmits data to another device in the control loop. In various embodiments, the communication schedule may be generated based on the time costs determined in step 620. For example, reception of a control command sent by a virtualized controller may be timed within the communication schedule such that the path delays from the controller to the controlled device are considered, as well as any delays associated with the controller generating the control command.

At step 630, as described in greater detail above, the scheduling device installs the communication schedule at the controller and the controlled device (as well as any other devices involved in the control loop), by instructing the devices to use the generated schedule. For example, the communication schedule may include a time slot during which the controller is to send a control command to the controlled device. Procedure 600 then ends at step 635.

Figure 7:
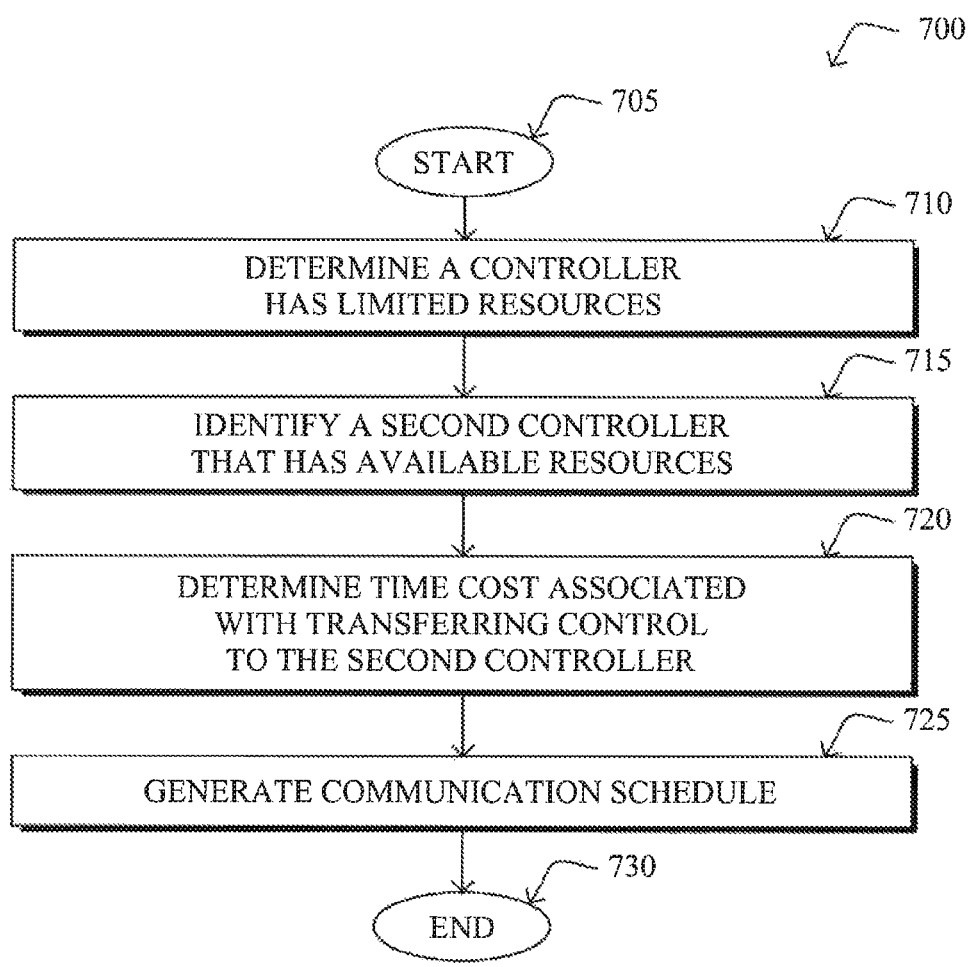
FIG. 7 illustrates an example simplified procedure for passing control between controllers.

FIG. 7 illustrates an example simplified procedure for passing control between controllers in accordance with one or more embodiments described herein. The procedure 700 may start at step 705, and continues to step 710, where, as described in greater detail above, a determination is made that the available resources at a controller/server are limited. For example, a PCE or other scheduling device may receive a notification from a server executing a control application within a virtual machine that the server is approaching a threshold amount of CPU or memory usage.

At step 715, the scheduling device identifies a second server/controller that has available resources, as described above in greater detail. In some embodiments, the second server/controller may be identified based on controller metrics received from the second server/controller. In some cases, the second server/controller may be identified using a load balancing mechanism that attempts to balance resource usage by a set of servers.

At step 720, the scheduling device determines a time cost associated with transferring control from the current server/controller to the second server/controller, as detailed above. In various cases, the time cost may be based on a delay associated with transferring a control application to the second server, a delay associated with spawning a virtual machine on the second server to execute the control application, a delay associated with loading the control application into the memory of the second server, a delay associated with executing the control application on the second server, combinations thereof, or other information that may be indicative of the amount of time before the control application on the second server may take over control of the control loop.

At step 725, the scheduling device generates a communication schedule, as described in greater detail above. Based on the time costs associated with transferring control to the second server/controller, a corresponding communication schedule may be generated. Such a schedule may, for example, change the destination of a scheduled message from the first server to the second server. In further embodiments, the communication schedule may be provided to the second server/controller, thereby seamlessly integrating the transmissions of the control application executed by the second server into the control loop. Procedure 700 then ends at a step 730.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for the deployment of virtual controller (e.g., a programmable logic controller) applications in a data center or fog environment, while maintaining the deterministic aspect of the control loops that the controllers serve. In some aspects, the notion of control loops may be extended to any number of forms of computer networks, thus allowing network and process function virtualization with load balancing among application servers. In further aspects, the techniques herein allow a virtual machine executing a control application within a running control loop to be transferred seamlessly to another server.

While there have been shown and described illustrative embodiments that provide for the arbitration of time contention in a shared-media communication network, it is to be understood that various other adaptations and modifications may be made within the spirit and scope of the embodiments herein. For example, the embodiments have been shown and described herein primarily with respect to LLNs. However, the embodiments in their broader sense are not as limited, and may, in fact, be used with other types of networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
receiving, at a scheduling device in a network, routing metrics regarding a network path between a device controller and a networked device in a control loop running in the network, wherein the routing metrics are indicative of a time associated with transferring data along various links of the network path, wherein the device controller executes a control process within a virtual machine to control the networked device;
receiving, at the scheduling device, controller metrics from the device controller, wherein the controller metrics indicate a delay associated with the device controller executing a control application;
determining, by the scheduling device based on the routing metrics and the controller metrics, a time cost associated with the network path and one or more control operations of the control application performed by the device controller, wherein the time cost is a sum of the time associated with transferring data along the various links of the network path and the delay associated with the device controller executing the one or more control operations of the control application;
generating, by the scheduling device, a communication schedule based on the time cost; and
sending, by the scheduling device, instructions to the device controller and the networked device that instruct the device controller and the networked device to use the communication schedule for performing the one or more control operations in the control loop at specific times.

2. The method as in claim 1, wherein the controller metrics include at least one of: a delay associated with loading the control application or virtual machine, a delay associated with scheduling the control application to execute, or an execution time associated with the control application performing a particular operation.

3. The method as in claim 1, wherein the networked device comprises a sensor, and wherein the communication schedule indicates a time slot at which the sensor is to provide a measurement to the device controller.

4. The method as in claim 1, wherein the networked device is an actuator and the device controller is a programmable logic controller.

5. The method as in claim 1, wherein the routing metrics indicate a latency for the network path.

6. The method as in claim 1, further comprising:
determining that the device controller has limited resources available;
identifying a second device controller that has available resources;
determining a time associated with transferring control to the second device controller; and
generating a new communication schedule based on the time cost associated with transferring control to the second device controller.

7. The method as in claim 6, wherein the new communication schedule is based on a time associated with a new path from the second device controller to the networked device.

8. The method as in claim 1, further comprising:
selecting the network path based on the routing metrics.

9. An apparatus operating as a path computation element, comprising:
one or more network interfaces to communicate with a network;
a processor coupled to the network interfaces and configured to execute computer instructions; and
a memory configured to store the computer instructions executable by the processor, the computer instructions when executed configured to:
receive routing metrics regarding a network path between a device controller and a networked device in a control loop running in the network, wherein the routing metrics are data indicative of a time associated with transferring data along various links of the network path, wherein the device controller executes a control process within a virtual machine to control the networked device;
receive controller metrics from the device controller, wherein the controller metrics indicate a delay associated with the device controller executing a control application;
determine, based on the routing metrics and the controller metrics, a time cost associated with the network path and one or more operations of the control application performed by the device controller, wherein the time cost is a sum of the time associated with transferring data along the various links of the network path and the delay associated with the device controller executing the one or more control operations of the control application;
generate a communication schedule based on the time cost; and
send instructions to the device controller and the networked device that instruct the device controller and the networked device to use the communication schedule for performing the one or more control operations in the control loop at specific times.

10. The apparatus as in claim 9, wherein the controller metrics include at least one of: a delay associated with loading the control application or virtual machine, a delay associated with scheduling the control application to execute, or an execution time associated with the control application performing a particular operation.

11. The apparatus as in claim 9, wherein the networked device comprises a sensor, and wherein the communication schedule indicates a time slot at which the sensor is to provide a measurement to the device controller.

12. The apparatus as in claim 9, wherein the networked device is an actuator and the device controller is a programmable logic controller.

13. The apparatus as in claim 9, wherein the routing metrics indicate a latency for the network path.

14. The apparatus as in claim 9, wherein the process when executed is further configured to:
determine that the device controller has limited resources available;
identify a second device controller that has available resources;
determine a time associated with transferring control to the second device controller; and
generate a new communication schedule based on the time associated with transferring control to the second device controller.

15. The apparatus as in claim 14, wherein the new communication schedule is based on a time associated with a new path from the second device controller to the networked device.

16. The apparatus as in claim 9, wherein the process when executed is further configured to:
select the network path based on the routing metrics.

17. A tangible, non-transitory, computer-readable media having software encoded thereon, the software when executed by a processor of a path computation element configured to:
receive routing metrics regarding a network path between a device controller and a networked device in a control loop running in the network, wherein the routing metrics are data indicative of a time associated with transferring data along various links of the network path, wherein the device controller executes a control process within a virtual machine to control the networked device;
receive controller metrics from the device controller, wherein the controller metrics indicate a delay associated with the device controller executing a control application;
determine, based on the routing metrics and the controller metrics, a time cost associated with the network path and one or more operations of the control application performed by the device controller, wherein the time cost is a sum of the time associated with transferring data along the various links of the network path and the delay associated with the device controller executing the one or more control operations of the control application;
generate a communication schedule based on the time cost; and
send instructions to the device controller and the networked device to instruct the device controller and the networked device to use the communication schedule for performing the one or more control operations in the control loop at specific times.

18. The computer-readable media as in claim 17, wherein the controller metrics include at least one of: a delay associated with loading the control application or virtual machine, a delay associated with scheduling the control application to execute, or an execution time associated with the control application performing a particular operation.

* * * * *

UNITED STATES PATENT AND TRADEMARK OFFICE
CERTIFICATE OF CORRECTION

PATENT NO.        : 9,866,431 B2
APPLICATION NO.   : 15/611836
DATED             : January 9, 2018
INVENTOR(S)       : Patrick Wetterwald et al.

Page 1 of 1

It is certified that error appears in the above-identified patent and that said Letters Patent is hereby corrected as shown below:

In the Claims

In Column 15, Line 14, please amend as shown:
time associated with transferring control to the Signed and Sealed this
Eighth Day of December, 2020

Andrei Iancu
*Director of the United States Patent and Trademark Office*